`United States Patent Office`

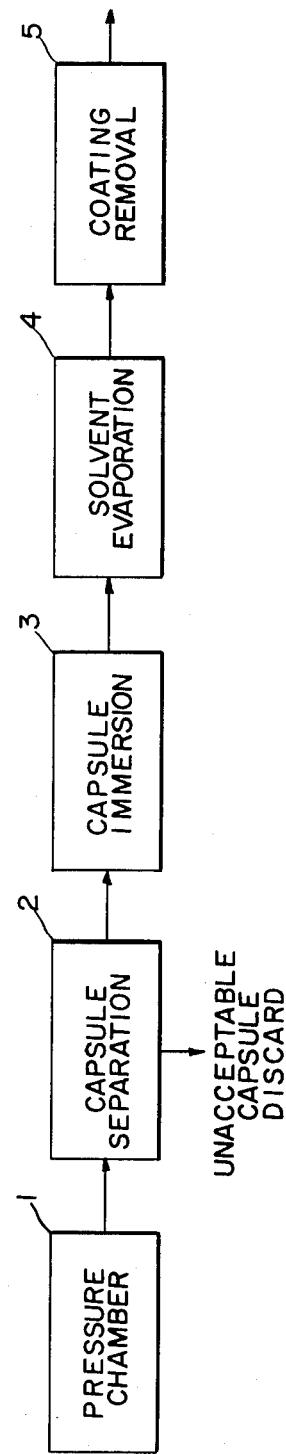

3,609,937
Patented Oct. 5, 1971

3,609,937
METHOD FOR FILLING CAPSULES
Edward W. Merrill, Cambridge, Mass., assignor to Hans H. Estin, Leonard W. Cronkhite, Jr., and William W. Wolbach, trustees of The Charles River Foundation
Filed Sept. 23, 1969, Ser. No. 860,195
Int. Cl. B65b 43/00
U.S. Cl. 53—29                                    14 Claims

ABSTRACT OF THE DISCLOSURE

Capsules having a cross-linked, permeable, elastomeric, flawless, continuous shell whether hollow or containing a porous core or a core consisting of polymeric matter incapable of escaping through the shell, are filled with solid or liquid material by immersing the capsules in a solution of the material to effuse the solution into the capsule and countereffuse gas or vapor from the capsule, or to effuse the solution into the capsule so that it dissolves in a core of polymeric matter. The solvent used to prepare the solution is evaporated from the interior of the capsule. The capsules can be tested for wall integrity prior to being immersed by subjecting them to high pressure to effuse an inert gas into the capsule and subsequently reducing the pressure on the capsules to cause inflation of the acceptable capsules and deflation or explosion of unacceptable capsules, or by causing sudden vaporization of solid or liquid vaporizable material within the core, which inflates only the acceptable capsules. This process is useful for filling a hollow or partially filled capsule with a drug.

---

This invention relates to encapsulated solid or liquid materials, particularly drugs and other therapeutic reagents which can be effused through the encapsulated material. More specifically this invention relates to encapsulated materials and to a method for preparing them which includes a series of steps whereby imperfect capsules are eliminated before being filled with the solid or liquid material.

Encapsulated drugs and processes for making the same have taken almost innumerable forms, including mating cylindrical shells mechanically pressed one inside the other, gelatin capsules made from hemispheres of gelatin to encapsulated fish liver oils, and capsules made by dipping solid drugs in suitable solutions whereby a temporary coating is applied sufficiently strong to contain the drug in a package. Frequently, the capsules are intended to disintegrate upon exposure to gastric or intestinal fluids.

Recently it has been found that certain drugs such as insulin will diffuse through elastomeric materials, such as silicone rubber, and that such drugs may be administered continuously and gradually over long periods of time by encapsulating them in the elastomer and implanting the capsule in the patient. (See Long & Folkman U.S. Patent No. 3,279,996). It is obviously essential that the walls of the capsules intended for implantation for the delivery of hormones for example, have long-term stability of their diffusive properties and of their mechanical properties and above all that the capsules, with 100% certainty, are assured of being free of leaks lest the contained drug escape too rapidly after implantation thereby causing hazard to the health of the patient.

Capsules suitable for implantation are usually made with a shell comprising elastomeric materials which are cross-linked ("vulcanized") in order to endow them with elastic adaptability while retaining their permeability properties.

Accordingly, it is customary to use elastomeric polymers capable of being subsequently cross-linked by suitable chemical means, usually with heating required. Suitable elastomeric polymers are the polymers of isoprene, butadiene, siloxanes (silicone rubber), and co- or terpolymers of ethylene, propylene, isobutylene and isoprene, butadiene and styrene, butadiene and acrylonitrile, and many others. Regardless of the cross-linking agent employed such as sulfur, peroxides or other vulcanizing agents, elevated temperature levels for significant periods of time are usually required to obtain the desired degree of cross-linking. Temperatures in excess of 150° and times usually in excess of 15 minutes, are typical of the conditions employed for cross-linking and represent a combination of conditions under which most pharamaceutical products intended for gradual release would be destroyed, denatured or partially decomposed with evolution of toxic side products. Thus, it is undesirable to form a capsule of unvulcanized elastomer around the pharmaceutical product and then vulcanize the elastomeric shell.

Presently available alternatives to the use of high temperature include the use of ionizing radiation to cross-link polymers at or below room temperature. However, the radiation that creates the chemical effect in the elastomer would necessarily interact adversely with a contained pharmaceutical product. Another means for avoiding high temperature vulcanization is to take advantage of easily provoked chemical reactions at room temperature. For example, a class of silicone rubbers, the ends of whose molecules in their fluid form have been capped by trifunctional acetoxy groups can be vulcanized at room temperature (RTV). When exposed to air containing moisture at room temperature, the acetoxy groups are hydrolyzed to release acetic acid and form silanol groups which then immediately react by condensation to form a three-dimensional siloxane network. During the self-vulcanization, the acidity necessarily is increased to levels which might readily denature most drugs and pharmaceutical products contained in capsules of this type.

It is also possible to form elastomeric capsules of any desired shape while leaving a hole in the wall thereof so that after complete vulcanization and other processing, the capsule may be filled with a drug via a hollow needle. However, this introduces problems attendant with the subsequent plugging of the hole and demonstrating that the hole has been effectively and permanently plugged. When the hole is not totally plugged, the drug will release at an undesirably rapid rate and/or the capsules will become unfit for use due to the introduction of foreign matter therein.

While the present invention is described in detail with reference to a method for encapsulating drugs, it is to be understood that the process of this invention is useful for filling capsules with any solid or liquid material so long as the material is capable of being effused through the pores of the elastomeric material forming the capsule walls.

The present invention provides capsules having a continuous flawless wall comprising a cross-linked elastomeric material free from materials which degrade the encapsulated medicament or drug. The capsules are formed so that they are free from holes and so that the encapsulated drug retains its efficacy.

This invention is based upon the discovery that hollow capsules and capsules containing a porous core or a polymeric core the molecules of which cannot escape through the elastomeric wall, having continuous cross-linked elastomeric walls can be filled with a drug by immersing the capsules in a solution of the drug to effect effusion of a gas or vapor from the capsule and countereffusion of the drug solution into the capsule.

Prior to immersing the capsules, they can be tested for wall strength and for holes by the method referred to in my copending application filed concurrently herewith. After the capsules are filled with the solution, any solvent used to form the solution is then removed by evaporation and effusion to leave the drug in solid or liquid form inside the capsule.

FIG. 1 is a schematic representation of one embodiment of this invention.

Referring to FIG. 1, the capsules are placed in a pressure chamber 1, and subjected therein to a gas pressure for a sufficient period to fill the interior of the capsules with the gas. The pressure is then reduced in pressure chamber 1 to effect inflation of only the acceptable capsules and non-inflation or explosion of unacceptable capsules. All the capsules are transported from pressure chamber 1 to a capsule separation step 2, wherein the acceptable inflated capsules are separated such as on the basis of size or buoynacy and recovered while the unacceptable capsules are discarded. The acceptable capsules, either in the inflated state or after they have become deflated, are immersed, in a solution of the drug for a sufficient period to cause effusion of the solution into the capsules at immersion step 3. The capsules filled with the drug solution are removed from immersion step 3 and are warmed in solvent evaporation step 4 to a moderate temperature. The solvent is evaporated and effused through the capsule walls to leave the drug in the capsule. In step 5, any coating of the drug on the exterior surfaces of the capsules is removed as by washing. The capsules obtained from step 5 are then ready for use.

The capsules to be filled are formed from elastomeric materials so processed that the resulting hollow capsule is chemically cross-linked (vulcanized) and has no intentional hole of any kind. When necessary, prior to contact with the drug, the capsules are treated to remove any by-products from the cross-linking step which may degrade the drug. Thus, the cross-linked elastomer can be immersed in a solvent to extract by-products obtained from the decomposition of cross-linking initiators such as to remove phenyl benzoate produced by the decomposition of benzoyl peroxide initiator.

The capsule is formed from an elastomer which is subsequently cross-linked to a degree so that it retains its shape and its flexibility. The cross-linked elastomer should be compliantly resilient and have an elastic modulus of between about 40 p.s.i. to 500 p.s.i. and an ultimate tensile strength of at least 1000 p.s.i. so that it can withstand the pressure exerted during inflation while retaining its shape and remaining integral under forces normally encountered in the body. The capsule can be any shape which renders it suitable for implantation such as spherical, elliptical, "pillow-shaped" or the like. The thickness of the capsule walls is such that the capsule is self-sustaining, mechanically and structurally strong to resist impact forces and permits diffusion of the drug at a controlled rate. The wall thickness depends upon the particular elastomer employed but ordinarily should be between about 1 mm. to 2 mm., and it should be between about ½ cm. to 2.0 cm. across the major axis so that a sufficient quantity of the drug can be retained therein.

The capsule can be formed by any method available for shaping elastomeric materials. Thus, the capsules can be made from an extruded tube of uncross-linked elastomer by crimping it into individual capsules and thereafter effecting cross-linking. Alternatively, the capsule can be formed by joining two complementary hemispheres of uncross-linked elastomer and then cross-linking the elastomer. Alternatively, the capsule may be formed by enveloping core pieces, such as microporous "foam rubber," or polymeric substance, whether cross-linked or not with the elastomeric wall material in its plastic state and then effecting cross-linking of the elastomeric material.

Exposure of the capsules to a non-condensable inert gas such as carbon dioxide under high pressure accomplishes two ends simultaneously: firstly to replace the contained oxygen and nitrogen gases and secondly to lead to a high gas pressure in the capsule resulting from the effusion of gas through the capsule wall. When the capsules are exposed to the high gas pressure, for example, thirty atmospheres pressure, the capsules may instantaneously buckle. But because of their elasticity and self-sustaining character, they will not be damaged. As the pressurizing gas gradually effuses into the capsule to replace the gas present in the capsule prior to the pressurizing step which effuses outwardly, the capsules resume their normal shapes. After a period of time, depending upon the capsule wall thickness and permeability, the gas pressure inside and outside the capsule are in equilibrium.

When the external pressure on the capsules is suddenly released, the gas in those capsules having perfect walls can only escape by gradual effusion whereas capsules having gross leaks will immediately lose their gas pressure and those which are mechanically weak will explode. Consequently, those capsules which are perfect rapidly expand at this stage and thereafter gradually decrease to their normal size over a period of hours. This permits ease of separating inflated acceptable capsules from unacceptable capsules on the basis of size of bouyancy. For example, the inflated capsules can be retained on a screen having holes of a diameter which are slightly larger than that of the original capsule while defective capsules or fragments of exploded capsules pass through the screen to be discarded. Alternatively, the capsules can be separated on the basis of buoyancy since the inflated capsules are more buoyant than the defective capsules. A moving stream of gas or a liquid can be employed for the separation. Alternatively, when capsules are made with a porous or polymeric core capable of inbibing solvent, the core may be partially filled with a volatile solvent such that when the capsules are suddenly heated, the solvent is flash vaporized, inflating the exterior elastomeric shell of perfect capsules. Alternatively, the capsules may be made with a solid vaporizable core such as camphor, such that when the capsule is suddenly heated, the core will vaporize completely, expanding the exterior shell only of the perfect, acceptable capsules.

The acceptable capsules, while still containing significant quantities of gas or vapor are immersed in a solution of the drug to be introduced. It is preferred to employ nearly saturated drug solutions to minimize the time needed to fill the capsule with the drug. The solution can comprise either a solution of a solid material or a liquid material which is to be effused into the drug. When the capsule is filled with a solution of a solid drug material, the solvent employed is chemically non-reactive to both the elastomeric material and the drug and effects a moderate swelling of the elastomeric material to enlarge the pores in the elastomer and thereby increase the rates of effusion and countereffusion. The gas effuses through the wall so that its partial pressure in the interior drops while the drug solution effuses into the capsule. The ultimate equilibrium state is approached when the gas concentration is substantially zero and the solution inside of the capsule is substantially identical in composition with the solution at the exterior wall of the capsule. It is preferred that the capsule be inflated when immersed in the drug solution to increase the rates of effusion and countereffusion.

The capsules are removed from the solution after being filled and the solvent, if any, is then evaporated from the capsules as for example by forced convection of air maintained at a slightly elevated temperature. The evaporated solvent is effused from the capsule which results in the precipitation of the solid drug in the capsule as soon as its saturation concentration is exceeded. Solvent evaporation also effects shrinking of the capsule to its original dimensions in closer conformity with the contained drug. The solvent evaporation step is not required when the capsule is filled with a liquid composition not containing a solvent. Obviously the wall of the capsule has finite permeability for the contained drug and therefore during the evaporation step, some of the drug will effuse out with the solvent and may be deposited as a powdery film on the capsule. This film may be easily removed by subsequent mechanical processes such as by washing.

In one embodiment of this invention, the capsules, during the forming step and prior to cross-linking the elastomeric material, can be filled with an inert liquid which improves effusion and countereffusion, providing that the inert liquid be insoluble in body fluids, or that it be osmotically excluded from escape by the continuous cross-linked elastomeric shell. Thus, when the capsules are formed from a tube, it is filled with the liquid prior to final vulcanization and thereafter it is formed into capsules by crimping and then vulcanized. Alternatively, when the capsules are formed by joining two complementary hemispheres of uncross-linked elastomers, the liquid can be introduced through a tube inserted through the uncross-linked wall. The tube is removed prior to cross-linking the wall and it then seals together and reverts to its original shape without a trace of a hole. Liquids for use in the capsules should be those in which both the pressurizing gas and the drug are soluble. The use of the inert liquid is desirable since the rate of effusion of the drug from a solution within the capsule is more uniform that when employing a solid drug alone since the total inside surface of the capsule contacts the solution while the solid drug may contact only a portion of the inside surface. Suitable liquids for filling the capsule are silicone oils e.g., (polydimethyl silicone of around 10,000 MW), fluorocarbon liquids and mineral oils. The same advantages can be realized by utilizing high molecular polymeric substances as core material, either in a cross-linked or non-cross-linked state, provided that the polymeric substance has a glass transition temperature lower than 20° C. and that it accept the drug to be contained as a species having high solubility.

The solvent employed should dissolve the drug to afford the preparation of concentrated solutions, must be inert to both the drug and the elastomeric material and should swell the elastomer upon contact to enlarge the pores therein without dissolving the elastomer. Accordingly, the choice of solvent and elastomer is made depending upon the drug used to fill the capsule. Thus, even though the solvent dissolves large concentrations of the drug, if it does not swell the elastomer to enlarge the pores and permit effusion of the drug through the elastomer, it is undesirable for use in conjunction with that elastomer. Similarly, even if the solvent can swell the elastomer to enlarge the pores but it cannot dissolve the drug in high concentrations, it is undesirable for use since the time necessary to effuse the desired quantity of drug into the capsule is excessive. Furthermore, if the solvent tends to dissolve the elastomer to a degree that the capsule loses its structural strength, it cannot be employed.

The elastomeric material can be employed to form the capsule, must be non-toxic, cross-linkable to the desired elastic modulus, inert to the drug and have a finite permeability to the contained drug to give accurate slow release of the drug into the body upon implantation. Non-toxic additives, usually employed in the elastomeric materials, may be employed include fillers such as silica or the like, provided only that the capsule retains its final shape after its processing and the drug can be diffused through the elastomer. Generally speaking, hydrocarbon rubbers and silicone elastomers are satisfactory for drugs having significant water solubility. Drugs with high lipid solubility will require encapsulation in the more polar elastomers such as polyurethanes or the like. It is preferred to employ silicone rubbers i.e., organopolysiloxane wherein the organic group attached is the silicon atrom are preferably monovalent hydrocarbons such as alkyl, aryl, alkenyl, aralkyl either unsubstituted or substituted with for example halogen; more preferably methyl, phenyl, and vinyl. This preference is because silicone rubbers have very high permeability to carbon dioxide, susceptibility to swelling by the commonly employed drug solvents such as by alcohols, relative freedom from toxic products of vulcanization, and are inert as an implanted material.

Thus, the particular elastomer and solvent employed for a given drug are chosen in accordance with the criteria set forth above for the drug-solvent-elastomer system. Ethanol is a commonly employed solvent for numerous drugs. Other commonly employed solvents useful in the present invention include alcohols such as methyl alcohol, isopropyl alcohol, and the like; ketones such as acetone, dimethyl ketone, diethyl ketone, methyl ethyl ketone and the like; aliphatic hydrocarbons such as pentane, hexane, heptane or the like; ethers such as diethyl ether; and mixtures thereof.

Representative drugs and medicaments which can be encapsulated by the process of this invention are listed by Long and Folkman in U.S. Pat. No. 3,279,996.

Various modifications can be made in the process of this invention without departing from its scope. Thus, an X-ray opaque material such as barium sulfate can be added to the elastomer composition to facilitate locating the capsule after implanation, or it may be incorporated in a porous core or in a polymeric core. Furthermore, after the capsule is filled, it can be coated with a non-porous, non-toxic material such as co-polymers of vinylidene chloride and acrylonitrile (Saran) to prevent diffusion of the drug prior to implantation. The coating is removed prior to implanation.

The following examples illustrate the present invention and are not intended to limit the same.

EXAMPLE 1

The following composition is prepared on a two-roll rubber mill:

| | Parts |
|---|---|
| Poly (dimethylsiloxane) with 0.1 mol percent vinyl methyl siloxane gum | 100 |
| Aerosil silica | 40 |
| 2,4-dichlorobenzoyl peroxide (in silicone fluid) | 1 |

The silicone rubber composition is sheeted out to a thickness of about 4.0 mm. which is then stamped from discs, approximately 1.1 cm. in diameter. The discs are placed in a companion mold having a male and a female part, each of hemispherical shape such that, when the parts are fully closed, the discs are deformed into hemispherical shells having an outer diameter of 1.0 cm., an inner diameter of 0.8 cm., and a depth slightly greater than the outer radius of 0.55 cm. The two parts of the mold containing the composition are quickly brought to a temperature of 100° C. which initiates the vulcanization process. At the end of approximately 4 minutes, the male part of the mold is removed leaving the female (hollow) part holding the now gelled but incompletely cross-linked silicone rubber in the form of a hemispherical shell. Two female mold sections each containing a hemispherical shell are brought together under moderate pressure so that the shells are joined at their rims to form a complete spherical capsule. The vulcanization process is continued by heating the molds to 110° C. for an additional 20 minutes. Thereafter, the hollow spherical capsules are sufficiently cross-linked to resist collapse and also form the spherical shells by the coalescence and cross-linking of molecules between the originally contiguous rim surfaces. Either one of the two female molds enclosing the spherical capsules is removed and the capsule, resting in the other mold, is cured for 10 hours at 210° C. in an air oven to effect total decomposition of the peroxide, evolution of volatile by-products, and completion of the cross-linking reaction.

The cross-linked capsules are placed in a pressure vessel, and carbon dioxide is admitted into the vessel from a cylinder until the pressure is 450 p.s.i. For best results the capsules remain in the vessel under this pressure for one hour. The gas pressure is then suddenly released, the vessel is opened and the capsules are poured over a square weave mesh screen having a clearance between wires of 1.1 cm. Alternatively, a sheet with punched holes of 1.1 cm. may be used. Defective capsules and those with pinholes rapidly lose carbon dioxide and shrink to their initial diameters, whereupon they fall through the holes. Acceptable capsules retain the carbon dioxide and immediately expand to a diameter of 1.3 cm. or more (depending on the tensile modulus which is a function of filler loading, vulcanizing conditions, elastomer composition, etc.). The carbon dioxide diffuses through the capsule wall, flushing out gases previously contained in the capsule. While the capsule is still slightly inflated, it is immersed in an ethyl alcohol solution of insulin to be diffused into the capsule for a period of five days. The capsules are then removed from the solution, heated to about 50° C. for about 6 hours to remove solvent from the capsule interior to obtain capsules filled with insulin.

EXAMPLE 2

0.25 gram pieces of polydimethyl siloxane elastomer gum stock, with 60% barium sulfate filler, are prepared in the shape of spheres by any convenient method such as by direct cold pressing between mating hemispherically hollowed molds. These pieces are then coated with a latex of natural rubber which is built up by successive spraying and air drying to form a shell with a thickness of 0.5 mm. The capsules are then exposed to sulfonyl chloride vapors at 20° C. for 2 hours which effects cross-linking of the natural rubber. The capsules are then soaked in diethyl ether at 20° C. for 30 minutes. As a result of this soaking the interior silicone material imbibes about 40% of its weight as ether. The capsules are then suddenly immersed in a glycol bath at 90° C., which causes rapid vaporization of the ether and inflation of acceptable capsules, which rise to the top of the glycol bath. Defective capsules fail to inflate, and sink to the bottom of the glycol bath because of their barium sulfate content. The acceptable capsules are those immediately collected and filled with the hormone estrogen by immersing them in a 20 wt. percent solution of estrogen in a solvent consisting of 45 wt. percent ethyl alcohol (anhydrous) and 55 wt. percent diethyl ether. After immersion for 14 hours, the capsules are removed, are placed in a vacuum oven, and are rendered solvent free therein by continuous evacuation of 20° C. under 5 mm. Hg pressure for 24 hours.

I claim:
1. The process for replacing gas or vapor in a capsule having a cross-linked, permeable, elastomeric, hole-free, continuous shell with a solid or a liquid material which comprises:
  immersing the capsule in a solution comprising the liquid or solid dissolved in a solvent for a sufficient period to cause effusion of the solution into the capsule and countereffusion of the gas or vapor from the capsule, removing the capsule from the solution and evaporating solvent from the interior of the capsule.

2. The process for replacing gas in a capsule having a cross-linked, permeable, elastomeric, hole-free, continuous shell with a solid or a liquid material which comprises:
  subjecting the exterior of the hollow capsule to an elevated gas pressure for a sufficient period to fill the capsule with an inert gas at elevated pressure, reducing the gas pressure on the exterior of the capsule to cause inflation of the capsule, immersing the inflated capsule in a solution comprising the liquid or solid dissolved in a solvent for a sufficient period to cause effusion of the solution into the capsule and countereffusion of the gas from the capsule removing the capsule from the solution and evaporating solvent from the interior of the capsule.

3. The process of claim 2 wherein the capsule is subjected to an elevated pressure of between 30 p.s.i. and 2000 p.s.i.

4. The process of claim 1 wherein the capsule is prepared by forming a silicone rubber in the shape of a capsule, vulcanizing the rubber so that its elastic modulus is between about 40 p.s.i. to 500 p.s.i. and its ultimate tensile strength is at least 1000 p.s.i., and removing by-products formed during vulcanization from the rubber.

5. The process of claim 2 wherein the capsule is prepared by forming a silicone rubber in the shape of a capsule, vulcanizing the rubber so that its elastic modulus is between about 40 p.s.i. to 500 p.s.i. and its ultimate tensile strength is at least 1000 p.s.i. and removing by-products formed during vulcanization from the rubber.

6. The process of claim 2 wherein the capsule is prepared by forming a silicone rubber in the shape of a capsule, vulcanizing the rubber so that its elastic modulus is between about 40 p.s.i. to 500 p.s.i. and its ultimate tensile strength is at least 1000 p.s.i., removing by-products formed during vulcanization from the rubber, and subjecting the capsule to an atmosphere of carbon dioxide between 30 p.s.i. and 2000 p.s.i.

7. The process of claim 1 wherein the capsule is prepared by forming a silicone rubber in the shape of a capsule to encapsulate a silicone oil, vulcanizing the rubber so that elastic modulus is between about 40 p.s.i. to 500 p.s.i. and its ultimate tensile strength is at least 1000 p.s.i. and removing by-products formed during vulcanization from the rubber.

8. The process of claim 2 wherein the capsule is prepared by forming a silicone rubber in the shape of a capsule to encapsulate a silicone oil, vulcanizing the rubber so that its elastic modulus is between about 40 p.s.i. to 500 p.s.i. and its ultimate tensile strength is at least 1000 p.s.i. and removing by-products formed during vulcanization from the rubber.

9. The process of claim 1 wherein the capsule is prepared by forming a silicone rubber in the shape of a capsule, said rubber comprising silicone molecules having the end groups capped by trifunctional acetoxy groups, vulcanizing the rubber by exposure to moisture so that its elastic modulus is between about 40 p.s.i. to 500 p.s.i. and its ultimate tensile strength is at least 1000 p.s.i., and removing by-products formed during vulcanization from the rubber.

10. The process of claim 2 wherein the capsule is prepared by forming a silicone rubber in the shape of a capsule, said rubber comprising silicone molecules having the end groups capped by trifunctional acetoxy groups, vulcanizing the rubber by exposure to moisture so that its elastic modulus is between about 40 p.s.i. to 500 p.s.i. and its ultimate tensile strength is at least 1000 p.s.i. and removing by-products formed during vulcanization from the rubber.

11. The process of claim 2 wherein the capsule is prepared by forming a silicone rubber in the shape of a capsule, said rubber comprising silicone molecules having the end groups capped by trifunctional acetoxy groups, vulcanizing the rubber by exposure to moisture so that its elastic modulus is between about 40 p.s.i. to 500 p.s.i. and its ultimate tensile strength is at least 1000 p.s.i., removing by-products formed during vulcanization from the rubber, and subjecting the capsule to an atmosphere of carbon dioxide between 30 p.s.i. and 2000 p.s.i.

12. The process of claim 1 wherein the capsule is prepared by forming a silicone rubber in the shape of a capsule to encapsulate a silicone oil, said rubber comprising silicone molecules having the end groups capped by trifunctional acetoxy groups, vulcanizing the rubber by exposure to moisture so that its elastic modulus is between about 40 p.s.i. to 500 p.s.i. and its ultimate tensile strength is at least 1000 p.s.i., and removing by-products formed during vulcanization from the rubber.

13. The process of claim 2 wherein the capsule is prepared by forming a silicone rubber in the shape of a capsule to encapsulate a silicone oil, said rubber comprising silicone molecules having the end groups capped by trifunctional acetoxy groups, vulcanizing the rubber by exposure to moisture so that its elastic modulus is between about 40 p.s.i. to 500 p.s.i. and its ultimate tensile strength is at least 1000 p.s.i., and removing by-products formed during vulcanization from the rubber.

14. The process of claim 2 wherein the capsule is prepared by forming a silicone rubber in the shape of a capsule to encapsulate a silicone oil, said rubber comprising silicone molecules having the end groups capped by trifunctional acetoxy groups, vulcanizing the rubber by exposure to moisture so that its elastic modulus is between about 40 p.s.i. to 500 p.s.i. and its ultimate tensile strength is at least 1000 p.s.i., removing by-products formed during vulcanization from the rubber, and subjecting the capsule to an atmosphere of carbon dioxide between 30 p.s.i. and 2000 p.s.i.

References Cited
UNITED STATES PATENTS

| | | | |
|---|---|---|---|
| 2,569,410 | 9/1951 | De Craene | 141—110 X |
| 3,303,105 | 2/1967 | Konikoff et al. | 55—16 X |

HOUSTON S. BELL, JR., Primary Examiner

U.S. Cl. X.R.

141—5